United States Patent
Hagen et al.

[11] Patent Number: 6,095,570
[45] Date of Patent: Aug. 1, 2000

[54] PLUG-IN COUPLING FOR PRESSURE APPLICATION SYSTEMS

[75] Inventors: Harald Hagen, Wipperfurth; Volker Kaminiski, Halver; Manfred Berg; Hilmar Hester, both of Wipperfurth, all of Germany

[73] Assignee: Armaturenfabrik Hermann Voss GmbH & Co., Wipperfurth, Germany

[21] Appl. No.: 09/069,441

[22] Filed: Apr. 29, 1998

[30] Foreign Application Priority Data

Oct. 29, 1997 [DE] Germany .......................... 297 19 247

[51] Int. Cl.⁷ ...................................... F16L 35/00
[52] U.S. Cl. ........................... 285/93; 285/321; 285/906; 285/924
[58] Field of Search ............... 285/93, 321, 924, 285/906, 23, 81, 82

[56] References Cited

U.S. PATENT DOCUMENTS

| | | | |
|---|---|---|---|
| 3,986,730 | 10/1976 | Martelli et al. | 285/23 |
| 4,105,226 | 8/1978 | Frey et al. | 285/321 X |
| 4,126,335 | 11/1978 | Voss | 285/81 X |
| 4,471,978 | 9/1984 | Kramer | 285/93 X |
| 5,112,089 | 5/1992 | Richard | 285/321 |
| 5,845,944 | 12/1998 | Enger et al. | 285/321 X |

FOREIGN PATENT DOCUMENTS

19621535  5/1996  Germany .

*Primary Examiner*—Dave W. Arola
*Attorney, Agent, or Firm*—Harness, Dickey & Pierce, P.L.C

[57] ABSTRACT

A plug-in coupling for pressurized systems having two coupling components (2, 4), namely a receiving component (2) and a connector component (4). The connecter component (4) includes a connecting shaft (6) which is inserted into a locator opening (8) of the receiving component (2) and is sealed around the perimeter and arrested against loosening by a holding element (20) situated in a recess (22) of the receiving component (2), first in a partially inserted, incompletely sealed, pre-locked position and secondly in a fully inserted, perfectly pressure sealed full lock-in position. The holding element (20) has arresting elements (28, 30) each of which engage behind a locking edge (24) of the connector component (4) when a lock-in connection (28, 24; 30, 24) is formed. The holding element (20) is relatively movable axially in the recess (22) of the receiving component (2) in such a way that at least in a full lock-in position, at least one arresting element (30) can be transferred, by shifting of the holding element (20) against the direction of insertion, from an unlocked position in which the respective lock-in connection (28, 24; 30, 24) can be released, to a locked position in which release of the lock-in connection (28, 24; 30, 24) is prohibited.

18 Claims, 12 Drawing Sheets

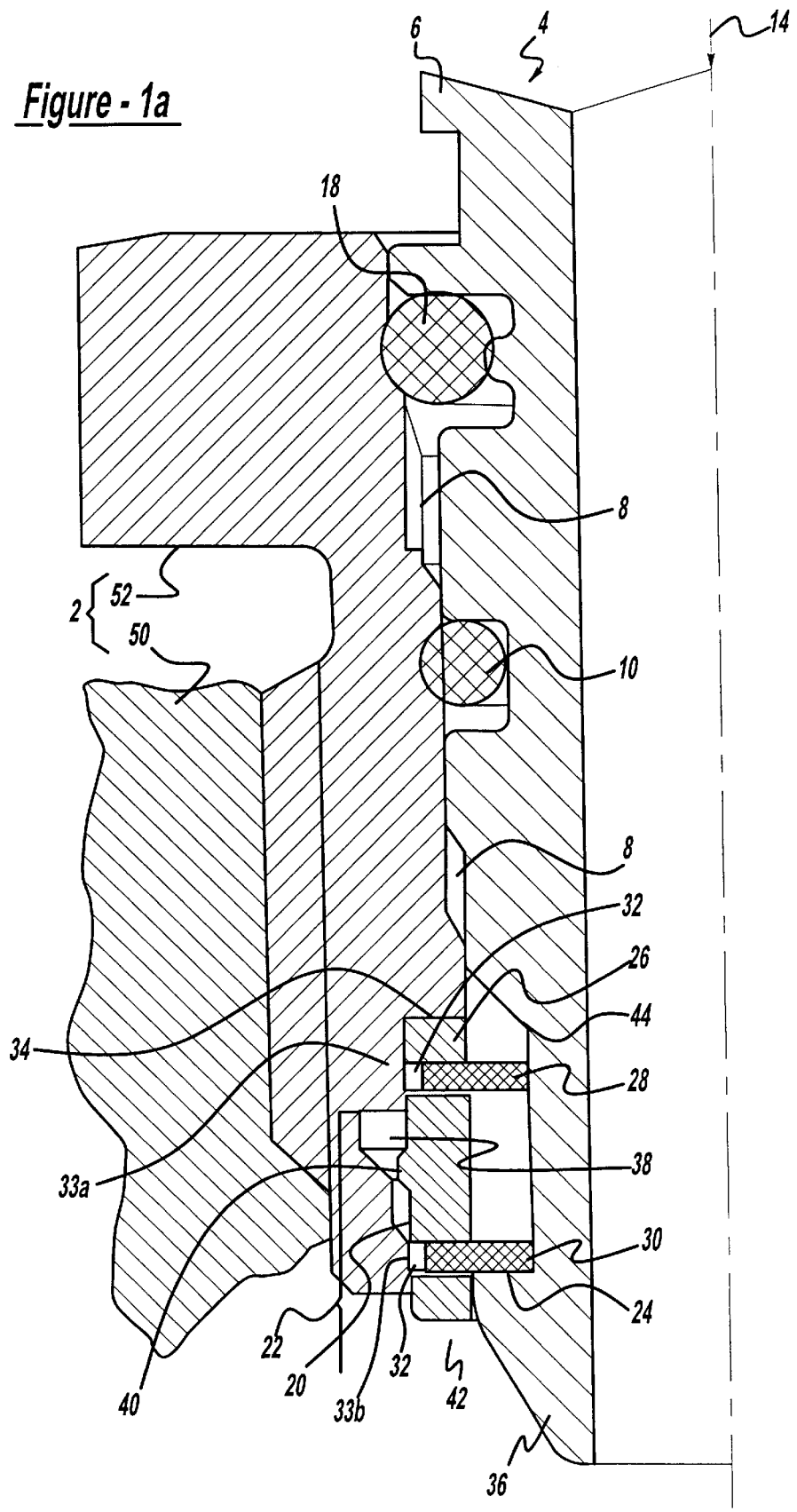

PLUG-IN COUPLING FOR PRESSURE APPLICATION SYSTEMS

BACKGROUND AND SUMMARY OF THE INVENTION

The present invention concerns a plug-in coupling for pressure application systems, consisting of two coupling components, namely a receiving component and a connector component, whereby the connector component can be inserted into a locating opening of the receiving component in a direction of insertion with a connecting shaft sealed around the perimeter, and can be arrested against loosening by a holding element situated in a recess of the one connector component firstly in a partially inserted, incompletely sealed pre-lock position, and secondly in a fully inserted perfectly pressure sealed full lock-in position.

Such types of plug-in couplings are used in motor vehicle braking systems for example, especially for pneumatic braking systems. Among others, one such plug-in coupling has been proposed for this purpose by the applicant in the German patent application DE 196 21 535. To prevent a faulty assembly which could induce a separation of the coupling under pressurization and which was not initially noticed, this plug-in coupling guarantees a "pre-locking", which prevents a complete separation of the coupling under pressurization in the not quite perfectly inserted state of the coupling components. This includes provision for a desired leakage in this pre-lock position. Upon pressurization, this state can be acoustically noticed by a leaking sound, without nevertheless leading to a complete sudden pressure drop. When the leaking sound occurs, the coupling can be transferred farther into the properly sealed and arrested "full lock-in position."

The plug-in coupling proposed in DE 196 21 535 particularly distinguishes itself in that the holding element cooperates with one and the same locking edge both in the pre-lock position and the full lock-in position. The holding element preferably consists of one bracket situated in the recess of the one coupling component and two arresting elements, which are clamped elastically deformable in the bracket and axially arranged one behind the other, whereby the first arresting element engages behind the second coupling component's locking edge in the pre-lock position, and the second arresting element engages behind it in the full lock-in position.

The proposed plug-in coupling is easy and inexpensive to manufacture and has been proven in actual assembly. It has nevertheless demonstrated that there is still room for improvement regarding the security of the plug-in connection during operation, particularly regarding this connection's stability under the influence of pressure variations in the working medium or of vibrations.

It is therefore the objective of the present invention, proceeding from the stated state of the art, to create a plug-in coupling which attains still higher security during pressure variations and vibrations which occur, without losing the coupling's advantages in assembly. In particular, this objective consists of improving the plug-in coupling proposed in DE 196 21 535 with the idea of yet higher dependability.

In accordance with the invention, this is attained by a plug-in coupling for pressure application systems consisting of two coupling components, namely a receiving component and a connector component, whereby the connector component can be inserted into a locating opening of the receiving component in a direction of insertion with a connecting shaft sealed around the perimeter, and can be arrested against loosening by a holding element situated in a recess of the one connector component firstly in a partially inserted, incompletely sealed pre-lock position, and secondly in a fully inserted perfectly pressure sealed full lock-in position, whereby in the two lock-in positions, arresting elements of the holding element each engage behind a locking edge of the other coupling component when a lock-in connection is formed, and whereby the holding element is designed and arranged relatively movable in the recess of a coupling component in such a way, that, at least in the full lock-in position, at least one arresting element, by shifting the holding element against the direction of insertion, can be transferred into a locked position, in which the release of the lock-in connection is prohibited through interlocking, from an unlocked position in which the lock-in connection can be released.

The manufacture and assembly of the plug-in coupling in accordance with the invention is not only very simple here, but a higher dependability and reliability of the lock-in connection(s) is attained in accordance with the invention in the full lock-in position (and optionally even in the pre-lock position).

In contrast to the subject of the proposed plug-in coupling with a stationary "double-locking" holding element, this holding element, in the case of the invention, is arranged mobile in the recess, in an axial direction in particular. The recess is preferably designed as an inner ring groove within the receiving component. At least one latching section, which is arranged stationary to the recess and which cooperates with the arresting element, can be provided for positive prevention of the release of the lock-in connection.

There are various possibilities for the structural arrangement of a latching section: for example, the latching section can be a component of the coupling component which contains the recess. But it can also be a component of a separate latching part arranged in the recess, especially a ring part, whereby an improved ability to disengage during disassembly of the plug-in coupling can be attained.

The positive locking of the lock-in connection's disengagement, by transferring the arresting elements from the unlocked into the locked position by shifting the holding element, can be provided with advantage, as previously mentioned, both in the full lock-in position and in the pre-lock position.

Other advantageous characteristics of the invention are contained both in the dependent claims and in the following description.

BRIEF DESCRIPTION OF THE DRAWINGS

The invention will now be explained in more detail on the basis of several preferred examples illustrated in the drawing. The drawings show.

The same parts are always provided with the same reference numbers in the drawing's various figures. As a rule, each will therefore only be described once.

DETAILED DESCRIPTION OF THE PREFERRED EMBODIMENT

Figure 1B:
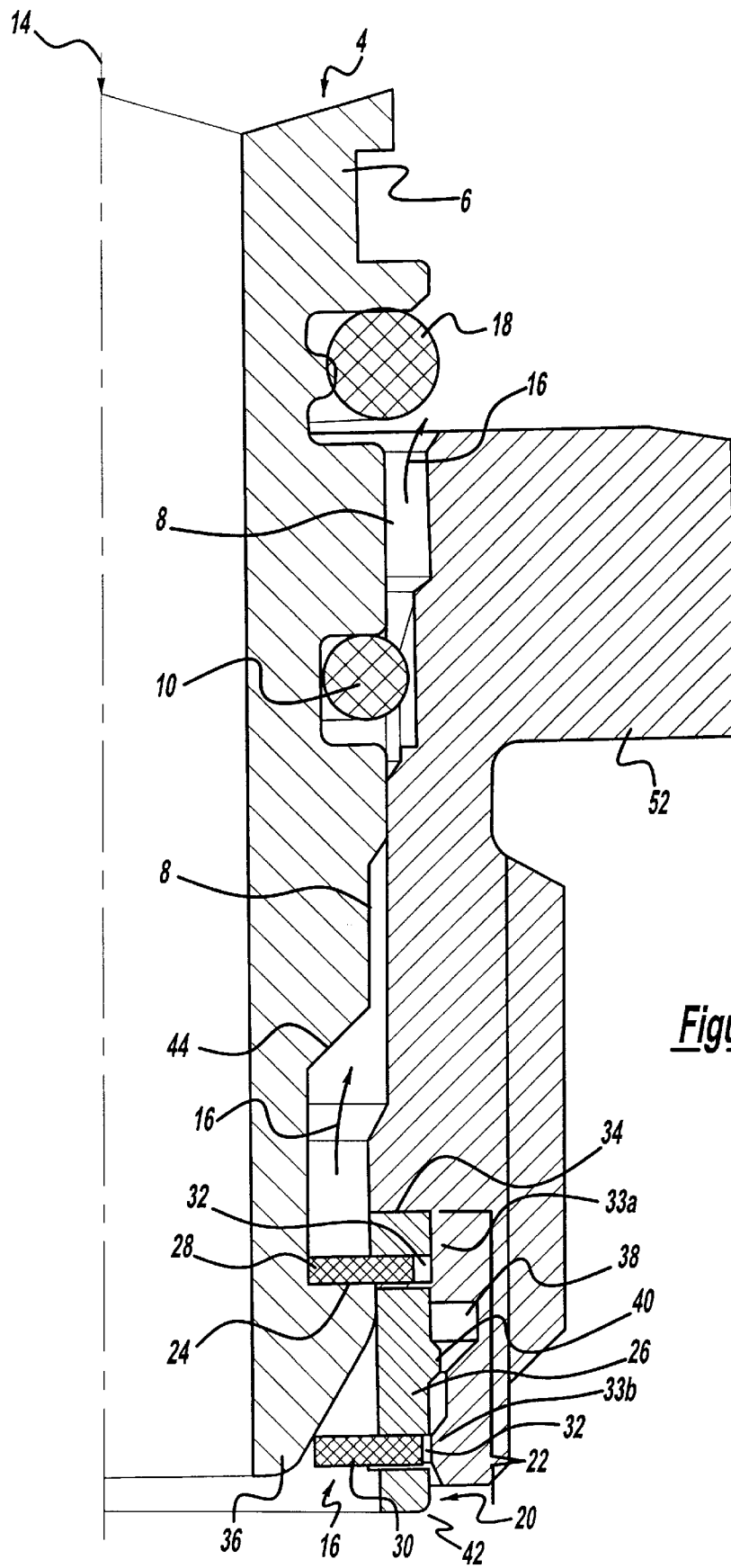
FIG. 1 is an axial section of a first embodiment of a plug-in coupling in accordance with the invention, whereby the completely inserted full lock-in position is drawn in the left half of the figure and the partially inserted pre-lock position, for the case of the locked position for releasing the lock-in connection respectively, is in the right half.

As can be seen in the two parts of FIG. 1, a first embodiment of a plug-in coupling in accordance with the invention consists of two coupling components, namely a receiving component 2 and a connector component 4. With a connecting shaft 6, the connector component 4 can be inserted into a locating opening 8 of the receiving component 2, thereby being sealed against the locating opening 8 by at least one gasket 10, and it is also arrestable, secured against disengagement opposite the direction of insertion (direction of arrow 14). In this case, both a partially inserted pre-lock position, shown on the right side of FIG. 1 and a completely inserted full lock-in position, shown as the left side of FIG. 1, of the connector component 4 are possible. In the pre-lock position which is already arrested against disengagement in the direction of the arrow 14, there is an incomplete seal of such a type that a signal, preferably in the form of an acoustically perceptible leaking sound, is produced when there is pressurization with a pressure medium, compressed air in particular. This deals with a defined limited leakage and a formation of a gap, caused by the arrangement and/or design of gasket 10 relative to the receiving component 2, through which the pressure medium flows out in doses as shown by the dashed arrow 16, thereby producing the leaking noise, as whistling, hissing, or the like, in particular. This can then be considered as a signal that the properly inserted full lock-in position has not yet been attained, so that, proceeding from the pre-lock position, the plug-in coupling can be transferred into the full lock-in state by farther insertion in this case.

As illustrated, a second seal 18, for sealing against the penetration of dirt, dust, humidity, and the like, can be provided, in the locating opening's 8 mouth area in particular, besides the gasket 10.

The plug-in coupling has a holding element 20, which, as illustrated, is situated in a recess 22 of a coupling component, preferably receiving component 2, and, as illustrated, engages behind a locking edge 24 of the other coupling component, preferably the connector component 4, locking with positive fit in the pre-lock position and in the full lock-in position, respectively. In the preferred example which is illustrated, the recess 22 is formed by an inner ring groove within the locating opening 8, while the locking edge 24 forms a one-sided limit stop of an outer ring groove on the connecting shaft 6.

It is likewise within the scope of the invention to provide the converse, i.e. to locate the holding element 20 in a recess or outer ring groove on the connecting shaft 6 and to form the locking edge 24 within the locating opening 8. The holding element 20 is designed in such a way that it cooperates with the same single locking edge 24, both in the pre-lock position (FIG. 1, right side) and in the full lock-in position (FIG. 1, left side), respectively.

In particular, the holding element 20 consists of a cage-like bracket 26 and two arresting elements 28, 30, which are axially one behind the other and clamped radial-elastically deformable in the bracket 26 in such a way, that, the locking edge 24 is engaged by the first arresting element 28 in the pre-lock position of FIG. 1, right side, and by the second arresting element 30 in the full lock-in position of FIG. 1, left side. In addition, the bracket 26 is preferably situated within the recess 22, designed as an inner ring groove, in the locating opening 8.

The bracket 26 is preferably designed as a circular body with two retaining spaces 32 for the arresting elements 28, 30. As illustrated, the retaining spaces 32 can be designed as transverse groove-like recesses or even as inner ring grooves.

As illustrated, the bracket 26 can be made as a single structural part, out of plastic in particular, or also as several parts. Here, the arresting elements 28, 30 and the retaining spaces 32 receiving them can be designed in such a way, that the arresting elements 28, 30 can be pushed into the retaining spaces 32 perpendicular to the centerline of the bracket 26 from outside.

It is advantageous for the arresting elements 28, 30 to consist of plastic or metal, especially spring steel, and they can be designed as slotted spring lock washers or as spring clips with two spring arms, as stampings or out of spring wire for example, connected as one by a fastening section.

In accordance with the invention, the holding element 20 is designed and arranged relatively movable in the recess 22 of a coupling component 2 in such a way, that at least in the full lock-in position, FIG. 1, left side, (in the embodiments illustrated here this is advantageous both in the pre-lock position and in the full lock-in position) the holding element (20) and hence the arresting elements 28, 30, can be shifted from an unlocked position to a locked position by moving the holding element 20 opposite the direction of insertion 14. In the unlocked position of the holding element 20, the lock-in connection 28, 24 or 30, 24 respectively can be released by radial movement of the arresting elements 28, 30. In the locked position of the holding element 20, release of the lock-in connection, 28, 24 or 30, 24 respectively, is positively prevented. FIG. 1 shows each of the lock-in connections 28, 24 and 30, 24 with the holding element 20 in the locked position.

For positive prevention of the release of the lock-in connection 8, 24 or 30, 24, two interconnecting sections 33a, 33b are provided which are arranged stationary to the recess 22 and cooperate with the arresting elements 28, 30.

If a positively locked position for releasing the lock-in connection 30, 24 is only supposed to be provided in the full lock-in position, it is sufficient for only one latching section 33b to be provided for cooperating with the respective arresting element 30.

In all embodiments, the bracket 26 has in particular, arranged diametrically opposite at least on the side radially facing the locking edge 24, two slot-like openings, arranged diametrically opposite each other, which, as a result of a radial motion of the arresting elements 28, 30 directed inwards, can be locally penetrated by the arresting elements 28, 30 for engaging behind the locking edge 24. In both the pre-lock position and in the full lock-in position, the outwardly directed backward movement of the arresting elements 28, 30 in the locked position of the holding element 20 is restricted by the latching section 33a, 33b, respectively. sections 33a, 33b being components of the receiving component 2, in which the recess 22 is located. The latching sections 33a, 33b are sections mutually staggered axially in the recess 22, each with a diameter reduced in comparison with the maximum diameter of the recess 22.

Figure 2A:
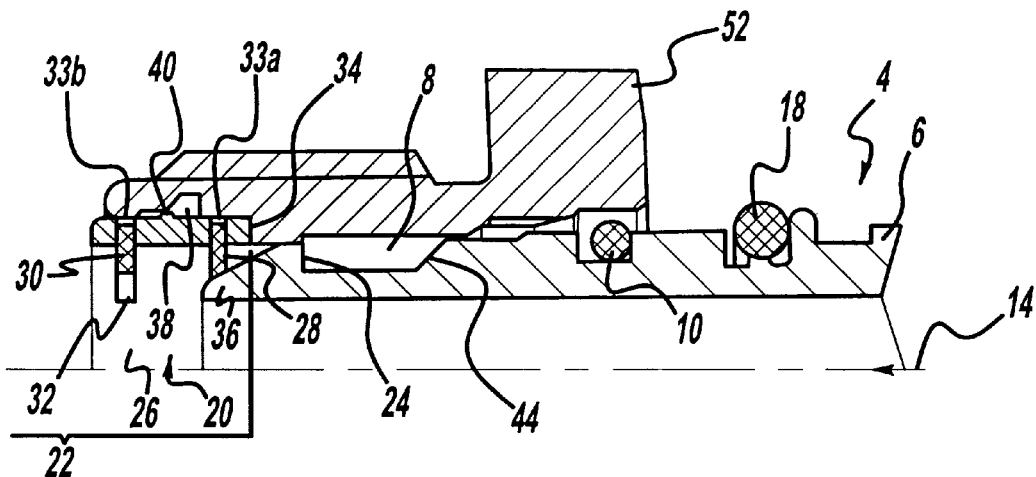
FIG. 2 is an axial section of the individual stages of the course of assembly of the first embodiment of a plug-in coupling in accordance with the invention illustrated in FIG. 1, presented according to time in the sequence 2a through 2f, at a smaller scale.

FIG. 2a shows the first stage, in which the connector component 4 is already inserted into the locating opening 8 of the receiving component 2. Seen in the direction of insertion 14, the holding element 20 is on the front edge 34 of the recess 22. The two arresting elements 28, 30 project into the locating opening 8. A conically designed point 36 of the connector component 4 thereby becomes arranged on the first arresting element 28. The backward movement of the arresting element 28, which is directed radially outwards (occurring from widening), is blocked in this position, since the retaining space 32 for the arresting element 28 is in the region of the first latching section 33a.

Figure 2B:
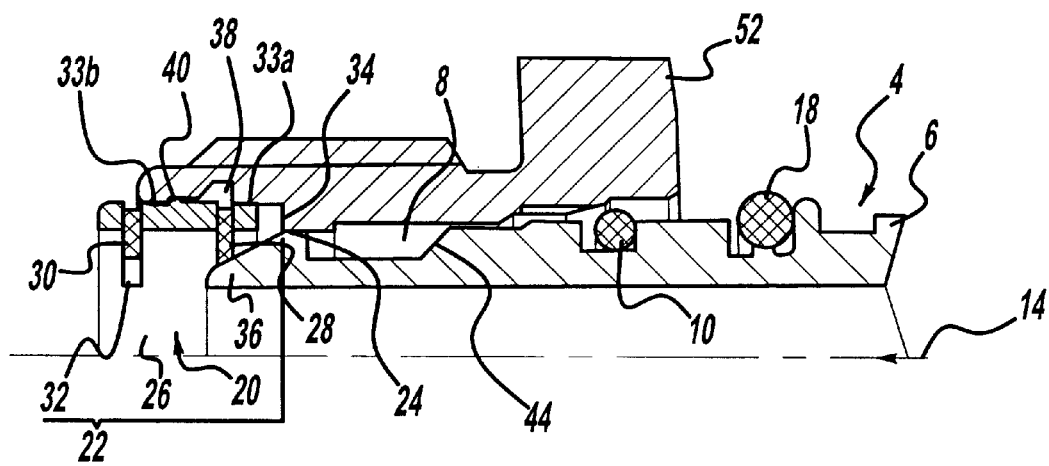

As shown in FIG. 2b, the holding element 20 is carried along by the connector component's 4 point 36 during farther insertion of the connector component 4, until the retaining space 32 is in the region 38, adjacent to the first latching section 33a in the direction of insertion 14, of a larger diameter of the recess 22. During the movement of the holding element 20, a projection 40, directed radially outwards, of the bracket 26 becomes arranged on a projection of recess 22, which is also directed radially inwards and is formed by the second latching section 33b. This produces resistance against farther movement of the holding element 20 in the connector component's 4 direction of insertion 14.

Figure 2C:
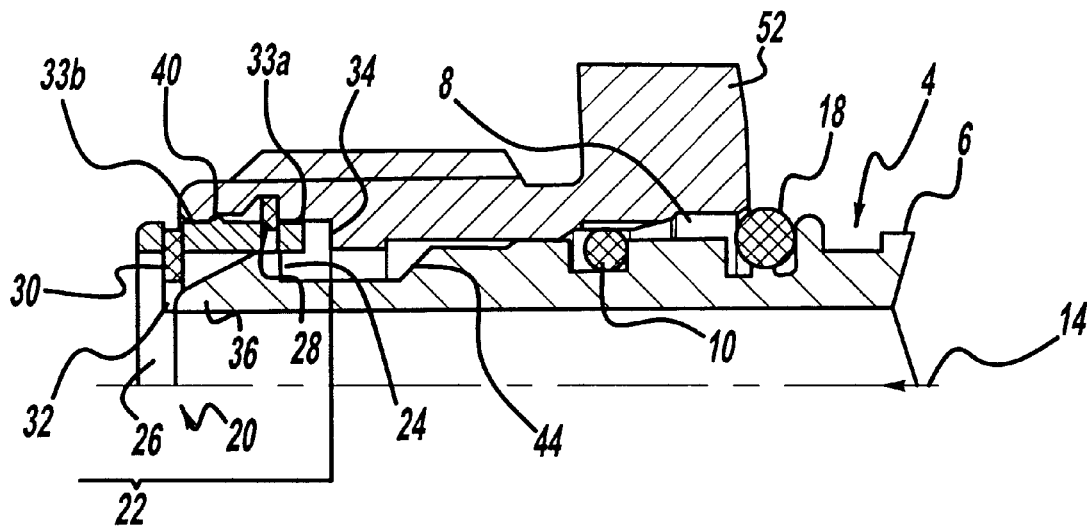

When the connector component 4 is inserted farther (FIG. 2c), a radial movement of the arresting element 28 outwards through the retaining space 32 occurs while the holding element 20 stays fixed.

Figure 2D:
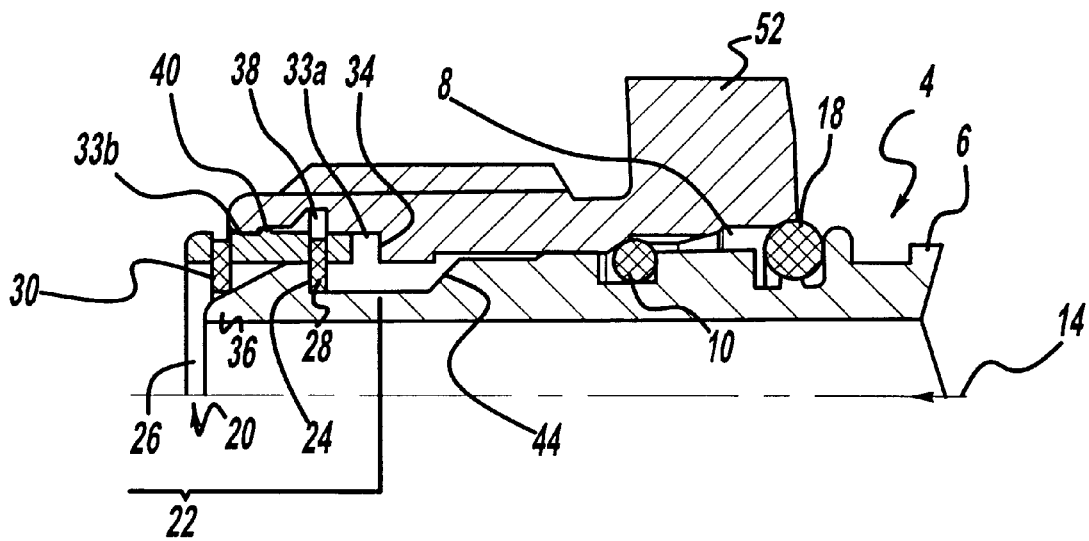

FIG. 2d shows the attainment of the partially inserted, incompletely sealed prelock position, in which the first arresting element 28 engages behind the locking edge 24 of the connector component 4. The arresting element 28 is still in an unlocked position, in which the lock-in connection 28, 24 can still be released.

The stage of assembly illustrated in the right side of FIG. 1, can follow the stage of FIG. 2d. The arresting element 28 arrives in a locked position by a shifting of the holding element 20 from a backwards movement of the connector component 4. The backward movement of the connector component 4 can be produced by simply pulling back or (as a rule) by pressurization.

Figure 2E:
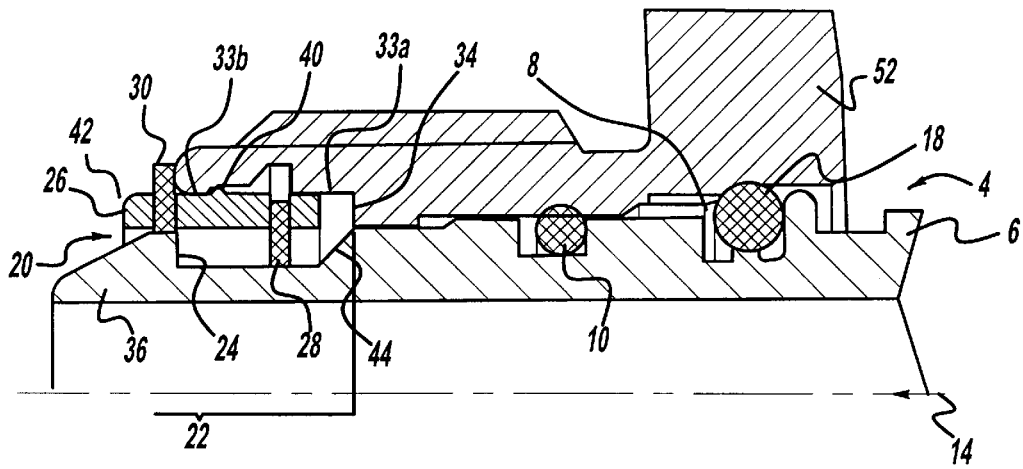

If the connector component 4 does not move back again out of the position illustrated in FIG. 2d, but, as this is planned for a proper assembly, is inserted farther, the plug-in coupling in accordance with the invention does not arrive in the stage illustrated in FIG. 1, right side, but in a stage in accordance with FIG. 2e. When the connector component 4 is inserted farther, a radial movement of the second arresting element 30 outwards occurs when the holding element 20 stays fixed. The retaining space 32 for the arresting element 30 is then in a position lying behind the second latching section 33b in the direction of insertion 14. Its opening, directed radially outwards, lies in a second region 42 of a larger diameter of the recess 22. In this stage, significant mating forces appear for the first time because of the pressing of the gaskets 10, 18.

Figure 2F:
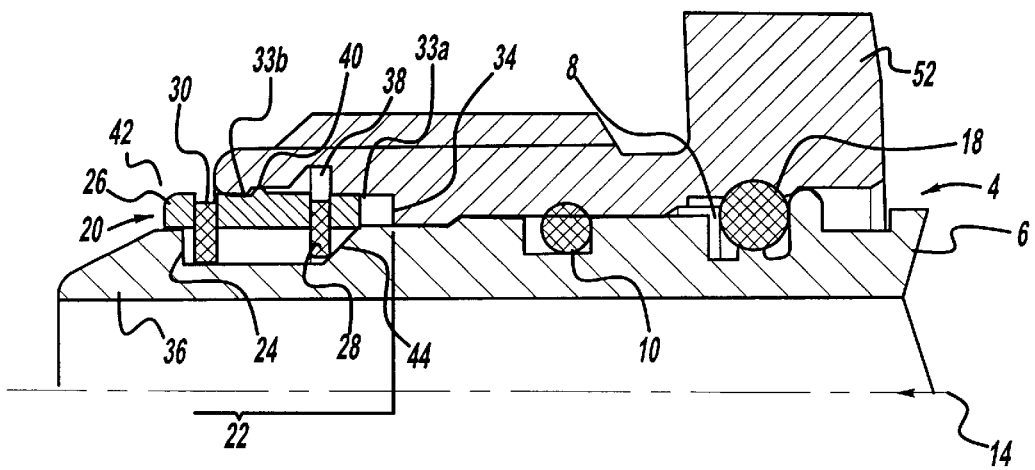

FIG. 2f now shows attainment of the completely inserted, completely pressure-tight sealed full lock-in position, in which the locking edge 24 of the connector component 4 is now engaged from behind by the second arresting element 30, which is itself now in its unlocked position, just like the first arresting element 28. The second limit stop of the outer ring groove on the connecting shaft 6, opposite the locking edge 24, is a conical sloped surface 44 designed similar to the connector's point 36. Under the effect of the radial forces directed outwards, caused by the arrangement of the first arresting element 28 on the conically designed sloped surface 44 of the connector component 4, a radial movement outwards occurs in the recess's 22 first region of enlarged diameter 38 during insertion, to prevent damage due to over-assembly (insertion too deep).

The state of the completely and orderly assembled plug-in coupling in accordance with the invention, (FIG. 1, left side), follows the stage illustrated in FIG. 2f. Here, the second arresting element 30 has arrived at its locked position from its unlocked position through a shifting of the holding element 20 opposite the direction of insertion 14. In this position, a backward movement of the arresting element 30 directed radially outwards is prevented or restricted by the latching section 33b. The backward movement mainly occurs by the spring action of the gasket 18 in the locating opening's 8 mouth area. A high operational dependability of the plug-in connector is given by the locking of the connector component 4 with the receiving component 2, attained with the help of the holding element 20, and the subsequent latching of the arresting elements 28, 30.

As shown in FIG. 1, left side, it can be advantageously provided, to attain an ability of the plug-in connection to disengage, that the receiving component 2 consists of at least two detachable parts connected together, namely a base part 50 and an insert 52, whereby these parts 50, 52 between each other delimit the recess 22 receiving the holding element 20. In this manner, the connecting shaft 6 can be extracted together with the insert 52 after the insert 52 has been released by the base part 50.

Whereas in the first example, the first region 38 of the recess's 22 enlarged diameter opposite the first latching section 33a is located in the insert 52, the second region 42 of the recess's 22 enlarged diameter opposite the second latching section 33b is advantageously located in the base part 50.

Figure 3A:
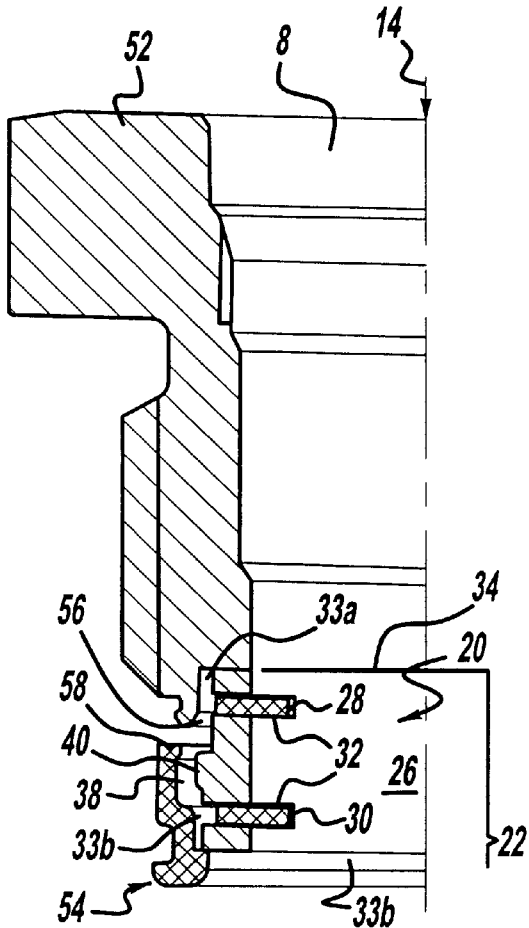
FIG. 3 likewise is an axial section of the individual stages of the course of assembly of a second embodiment of a plug-in coupling in accordance with the invention, presented according to time in the sequence 3a through 3d.
Figure 3B:
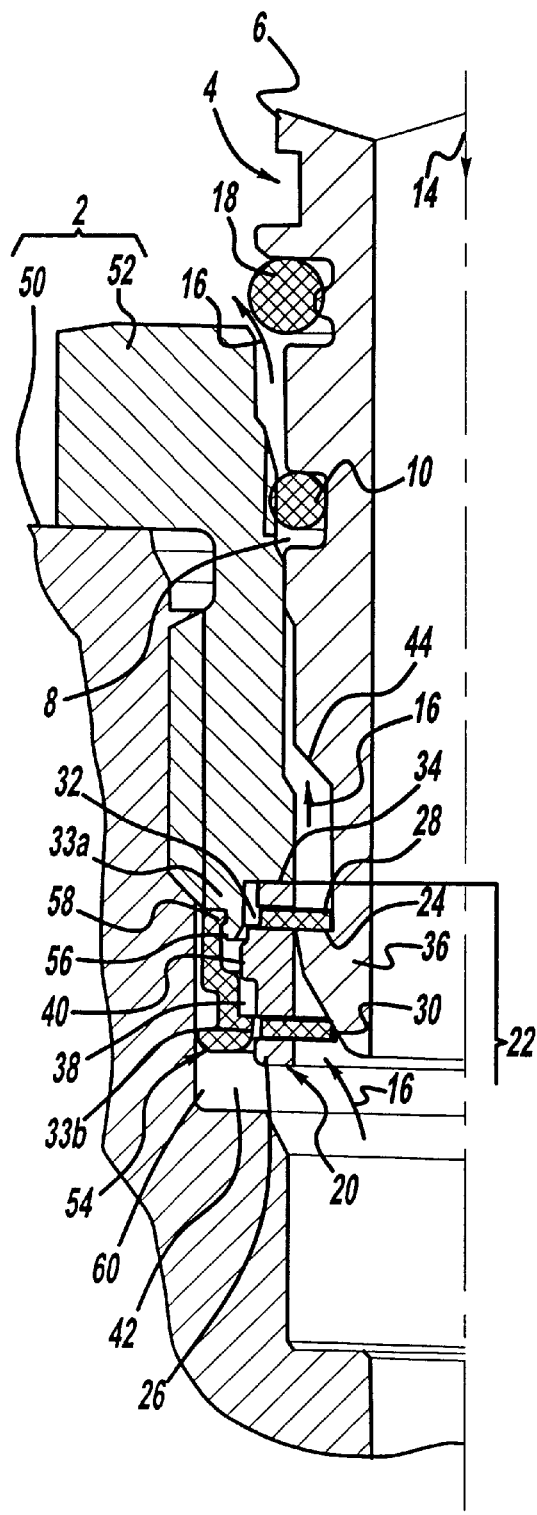
Figure 3C:
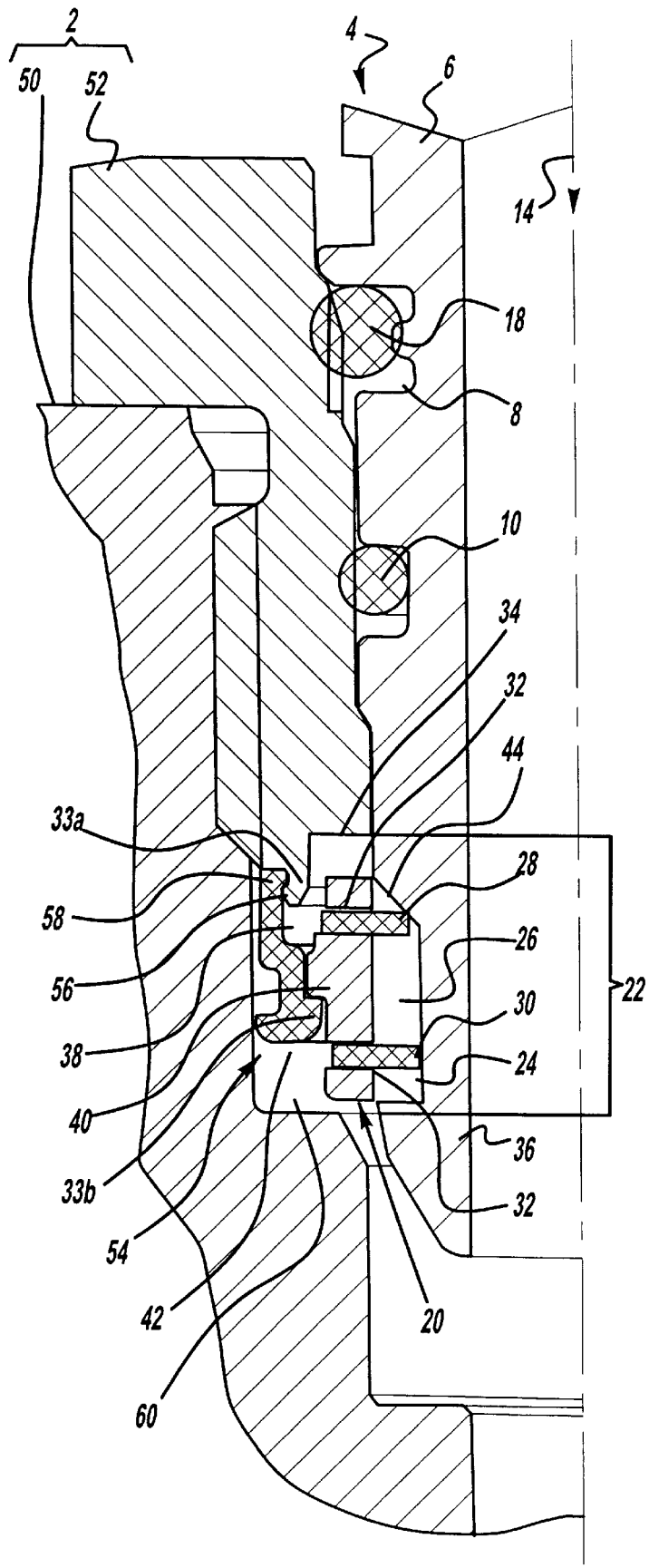
Figure 3D:
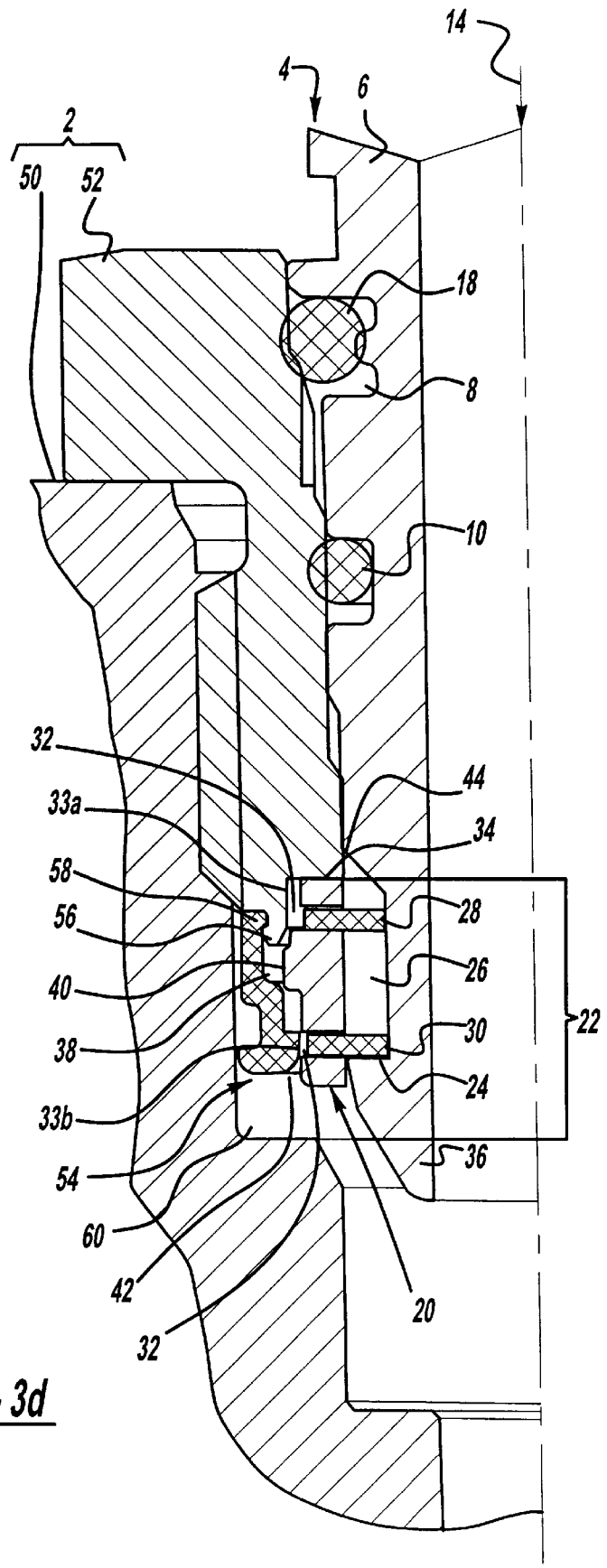
Figure 4A:
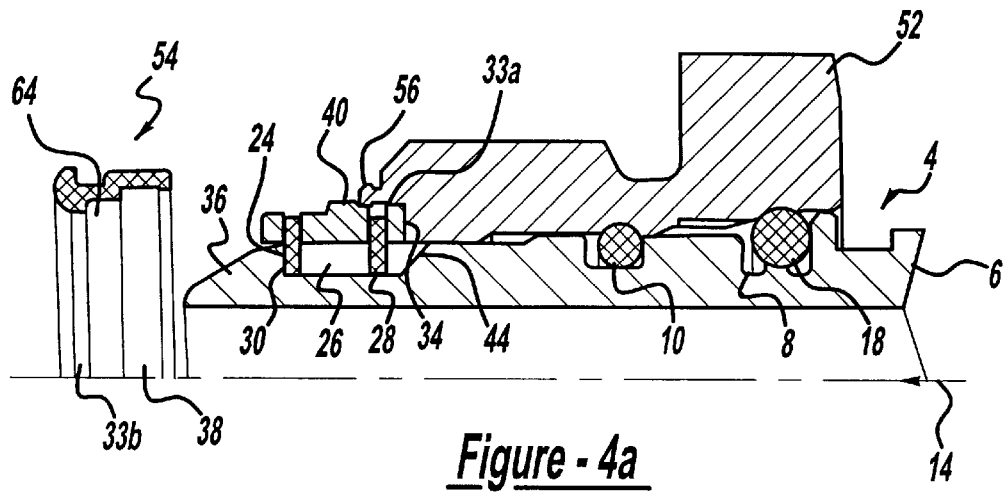
FIG. 4 is an axial section of the two stages of the course of disassembly of the second embodiment of a plug-in coupling in accordance with the invention illustrated in FIG. 3 presented according to time in the sequence 4a, 4b.
Figure 4B:
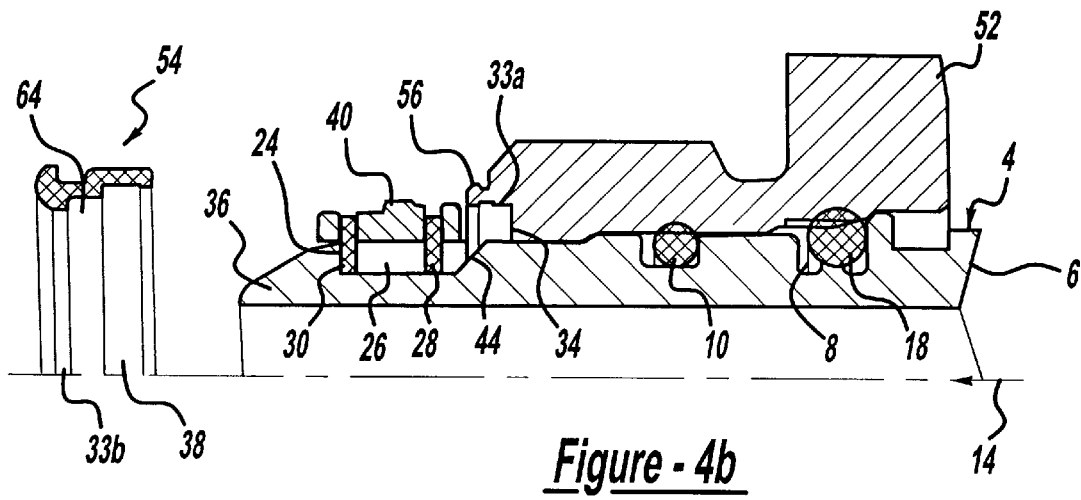

The second example of a plug-in coupling in accordance with the invention is described in FIGS. 3 (assembly—FIGS. 3a through 3d) and 4 (disassembly FIGS. 4a and 4b). The characteristic feature of the second example consists of the second latching section 33b being a component of a separate latching part 54, which can be designed of a ring part consisting of plastic. The region 38 of larger diameter, which borders the region of the first latching section 33a in the direction of insertion 14, is also in the latching part 54. As FIG. 3 shows, the latching part 54 can be fastened to the coupling component having the recess 22, on insert 52 of the receiving component 2 in particular, by a detachable connection. An advantage of this embodiment is that the insert 52 is easier to manufacture because of the simpler form of the part of the recess 22 inside it.

FIG. 3a shows the insert 52 of the receiving component 2, the separate latching part 54, which can be fastened to it, and the holding element 20 before the insertion of the connector component 4. The insert 52 and the latching part 54 preferably have complementary arresting agents, namely an outer torus 56 on the insert 52 and an inner torus 58 on the latching part 54, for producing their detachable connection. The holding element 20 is partially engaged around its perimeter by the insert 52 and partially by the latching part 54.

FIG. 3b shows the stage of incomplete assembly of the plug-in coupling's second embodiment in accordance with the invention. The insert 52 and latching part 54 are locked together by the outer torus 56 on the insert 52 and an inner torus 58 on the latching part 54. This is the pre-lock position of the connector component 4, and the first arresting element 28 has arrived at a locked position by shifting the holding element opposite the direction of insertion 14, produced by a premature pressurization for example. Within the locating opening 8, the first latching section 33a causing the locking is formed by an end segment of the insert 52 on the end facing the base part 50. The second arresting element 30 has also arrived at a locked position in which the motion directed radially outwards is prevented by the second latching section 33b. The second latching section 33b is thereby formed by a region of the separate latching part 54 which is reduced compared to the maximum inner diameter.

The completely inserted, completely pressure-tight sealed full lock-in position is achieved in accordance with FIG. 3c. The second arresting element 30 engages behind the connector component's 4 locking edge 24, after the connector's point 36 with the locking edge 24 was led past it. In this stage, both the first arresting element 28 and the second arresting element 30 are in an unlocked position. The projection 40 of the holding element 20 (or of its bracket 26), directed radially outwards, fits a projection of the latching part 54 which is directed radially inwards and which is also formed here by the second latching section 33b. Farther movement of the holding element 20 in the connector component's 4 direction of insertion 14 thereby encounters resistance, which leads to a relative motion of the connector component 4 toward the holding element 20 in the direction of insertion 14. Care must be taken in this respect, that the detachable connection (like the lock-in connection 56, 58 illustrated here) between the latching part 54 and the receiving component 2 is sufficiently fast, to withstand loosening from the mating force which it receives.

FIG. 3d shows the achievement of the final assembly state, i.e. there is a complete and orderly assembled plug-in coupling in accordance with the invention. From the stage of assembly in FIG. 3c, both arresting elements 28, 30 have arrived at their respective locked positions from their unlocked positions by a shifting of the holding element 20 against the direction of insertion 14.

As seen in FIG. 4, the second embodiment of the plug-in coupling in accordance with the invention has an improved ability to disengage which is advantageous for assembly, in contrast to the first embodiment. To disassemble the plug-in coupling, the insert 52 is first released from the base part 50. In this way, the connecting shaft 6 can be extracted together with the insert 52. FIG. 4a shows that the connection 56, 58 between the latching part 54 and the insert 52 can also be separated in a simple way. This occurs by pulling the latching part 54 off the insert in the direction of insertion 14. Afterwards, the connecting shaft 6 can be shoved out farther in the direction of insertion 14 into the position illustrated in FIG. 4b, in which the holding element 20 with both of its arresting elements 28, 30 is completely exposed. Both arresting elements 28, 30 can be removed, whereby a device to aid assembly can be used for propping open, for example.

It is not advantageous to provide a so-called molded boring, i.e. a diameter of the locating opening 8 which reduces itself over a step in the direction of insertion 14, either for the invention's first or second embodiment, since this is not necessary for it to function. If such a molded boring is present however, it does not interfere with the use of these embodiments in any way. It is merely necessary to take care, regarding the structural arrangement of the recess 22, that the recess 22 is dimensioned adequately large, that the individual stages of assembly, particularly those in which the connector component 4 with the holding element 20 is introduced into the locating opening 8 to the maximum extent (cf. FIGS. 2f and 3c), can proceed unhindered. An appropriately large clearance zone 60 is therefore to be provided in the axial direction as a component of the recess 22 in the base part 50.

Figure 5A:
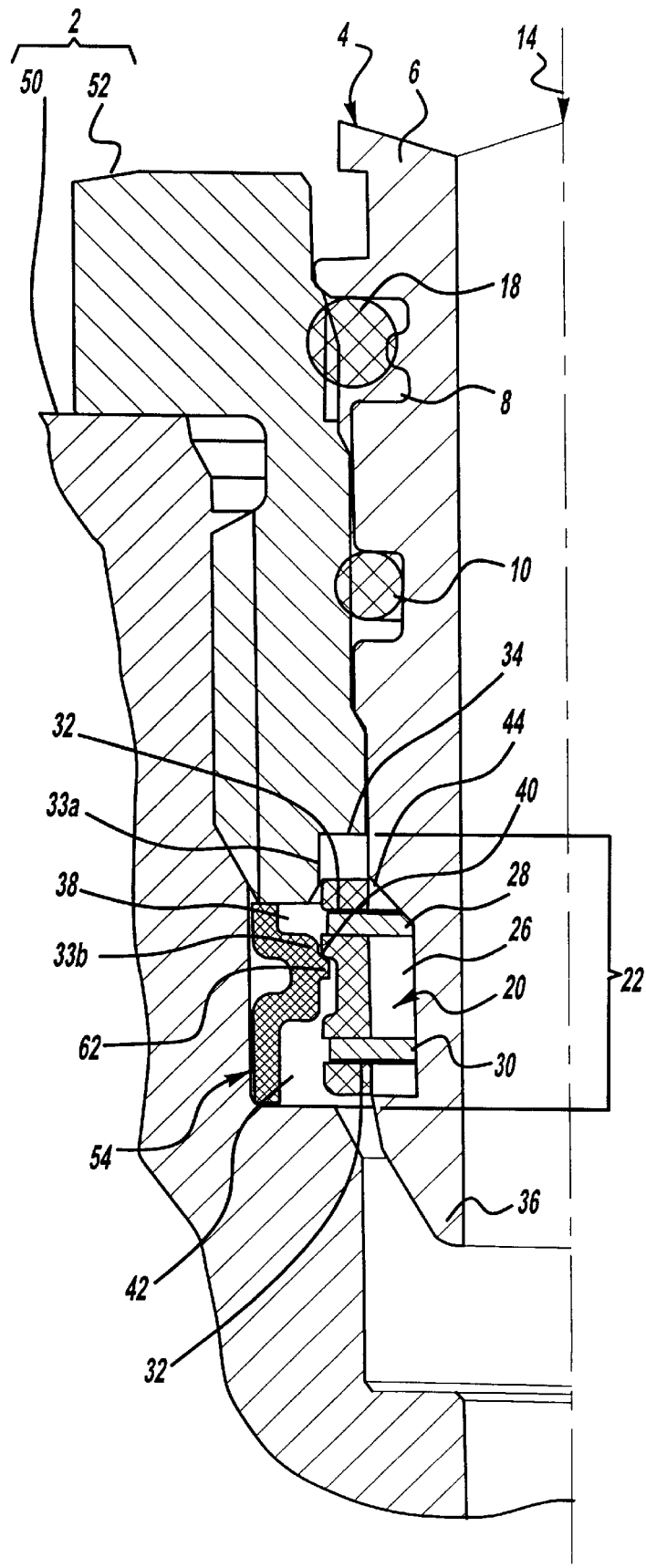
FIG. 5 is an axial section of a third embodiment of a plug-in coupling in accordance with the invention at full lock-in, first in an unlocked position for disengaging the lock-in connection (FIG. 5a), and secondly in a locked position (FIG. 5b)
Figure 5B:
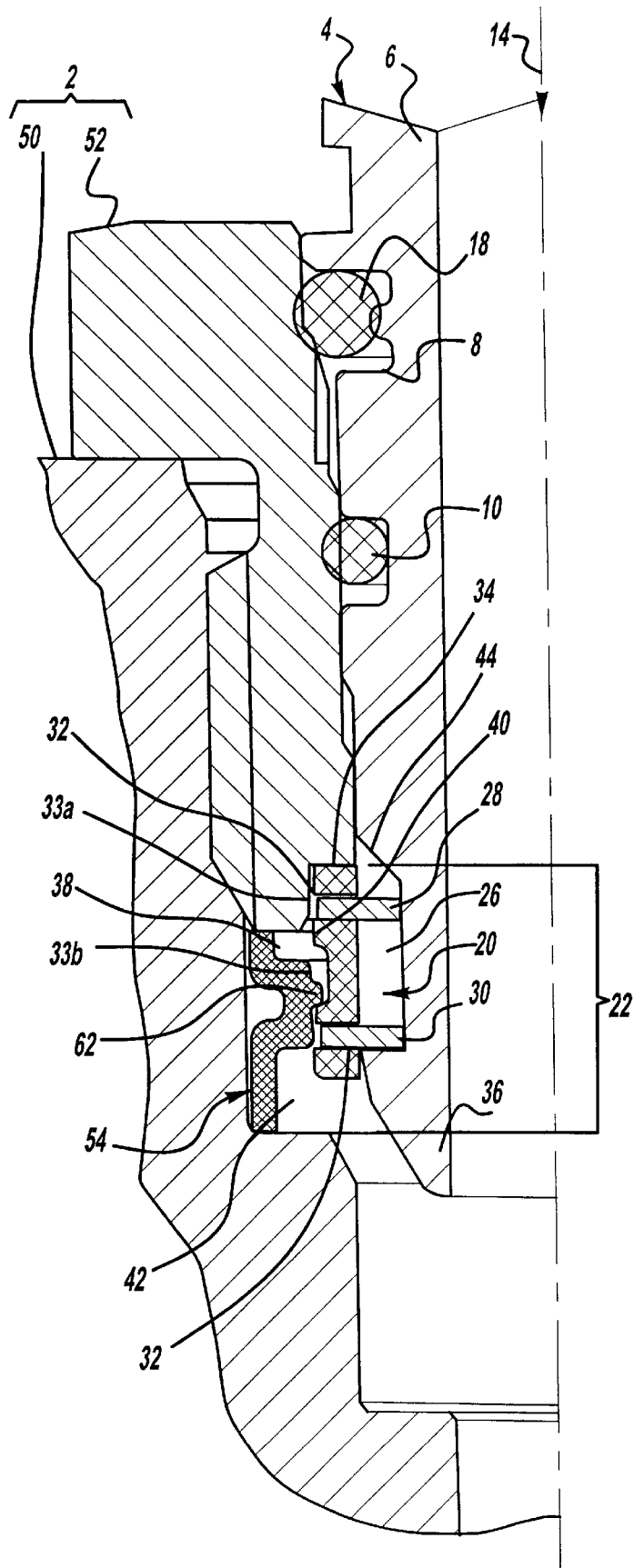

FIG. 5 illustrates a third embodiment of a plug-in coupling in accordance with the invention, where FIG. 5a shows the stage of assembly immediately after the full lock-in position and FIG. 5b the stage after the full lock-in and appearance of the locked position. The characteristic feature of the third example is that, as in the second embodiment, the second latching section 33b is a component of a second latching part 54, which can likewise be designed as a ring part, but the latching part 54 cannot be connected with the receiving component 2. In the assembled state, the latching part 54 is merely held in the receiving component 2 between the two parts (base part 50 and insert 52) which border the recess 22 and which are detachably connected with each other.

Other differences to the second embodiment exist in the arrangement of the shape of the interconnecting part's 54 inner contour and the holding element's 20 outer contour. The projection directed radially inwards (labeled as 62 here) of the latching part 54, on which the outwardly directed projection 40 of the holding element 20 (or its bracket 26) becomes arranged, is not formed by the second latching segment 33b here, but, in the direction of insertion 14, comes before the latching section 33b and also protrudes inwards opposite it. The cross section of the latching part's 54 wall thus receives the shape of an open U radially outwards. The projection 62, which cooperates with the holding element's 20 projection 40 is on the U's lower connecting arc, and extensions, each directed axially outward from the U's sides toward a front-sided arrangement on the base part 50 and on the insert 52 of the receiving component 2, are on its side ends.

The holding element's projection 40 directed radially outwards is accomplished as a one-sided limit stop of an outer ring groove on the bracket 26, lying between the retaining spaces 32 for the arresting elements 28, 30, whereby the axially directed movement of the latching part's 54 projection 62 directed radially inwards is restricted by this groove in both axial directions. Additionally, latching part 54 and bracket 26 can be so formed, that the latching part 54 can be latched onto the holding element 20.

Figure 6:
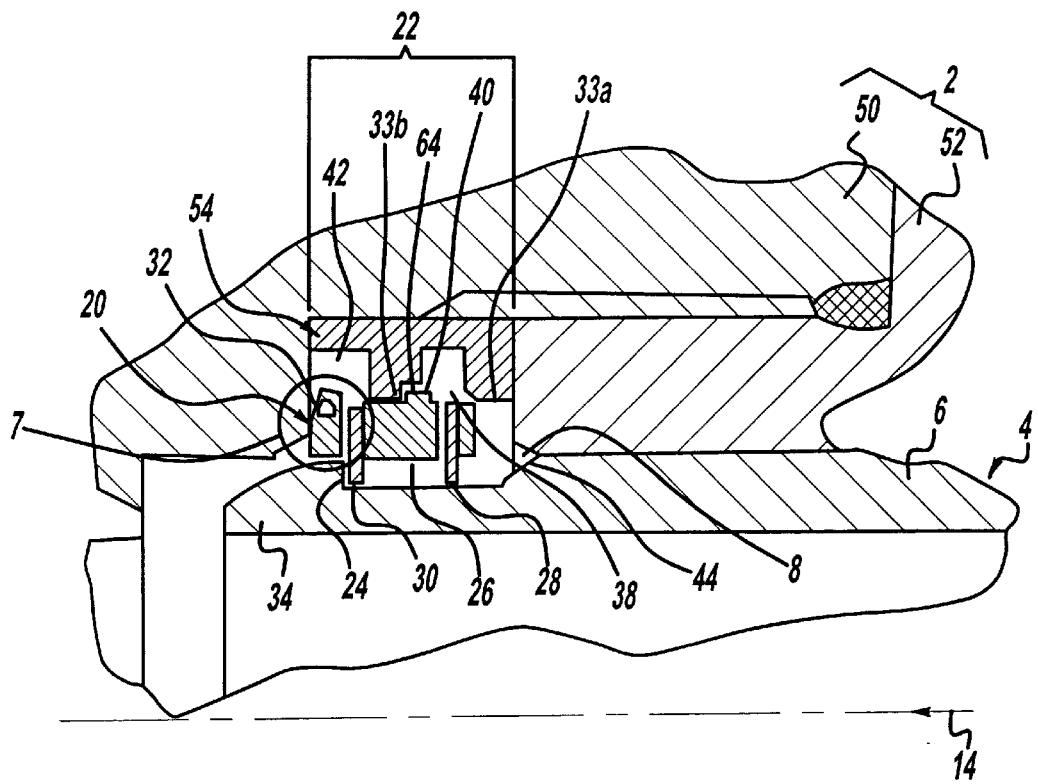
FIG. 6 is an enlarged axial section of a fourth embodiment of a plug-in coupling in accordance with the invention.

In a fourth embodiment of the plug-in coupling in accordance with the invention, illustrated in FIG. 6 showing the stage of assembly immediately after the full lock-in, a separate latching part 54, which can be inserted as a loose ring between the base part 50 and the insert 52, is likewise provided. In this embodiment, the holding element 20 has a shape that is shortened in length compared to the remaining embodiments, so that it isn't held in a region of expanded diameter of the insert's 52 locating opening 8, as in the other embodiments, but is held completely behind the insert 52, as seen from the direction of insertion 14, in the recess 22. Both latching sections 33a, 33b are components of the latching part 54.

The cross section of the latching element's 54 wall has the shape of a lying F, which faces the direction of insertion 14 with the foot of its vertical girder aligned with the plug-in coupling's axis, and faces inwards with its horizontal radially directed girders. The latching sections 33a, 33b, are on the fronts of the two horizontal girders of the F, whereby the second latching section 33b has a small recess 64, whose edge forms the projection which cooperates with the holding element's 20 projection 40. The latching part 54 fits the locating opening 8 on the inner wall of the insert 52 with its upper F-girder, and the front of the base part 50 with the foot of its vertical girder.

Figure 7A:
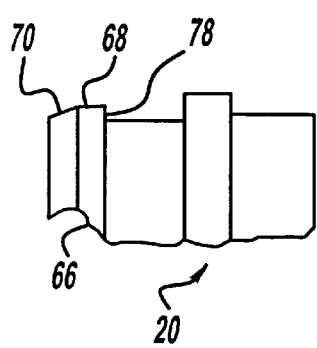
FIG. 7 is an axial section of two advantageous alternative embodiments (FIGS. 7a, 7b) of the holding element of the fourth embodiment of the plug-in coupling in accordance with the invention of FIG. 6, in the area of detail VII.
Figure 7B:
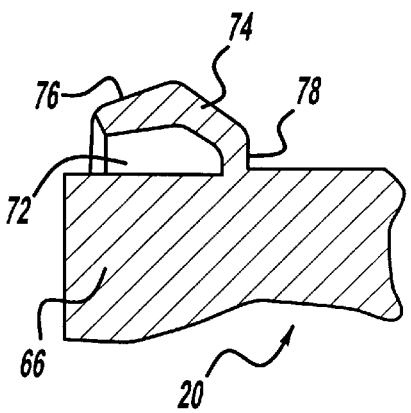

As FIG. 7 shows, the holding element 20 can be shaped in a different way in this fourth embodiment in accordance with the invention. The alternative embodiments concern the shape of the perimeter of an end section 66 of the holding element 20 on its side facing the direction of insertion 14. FIG. 7a additionally shows an embodiment in which this end section 66 has a diameter step 68 on the perimeter, which is provided to facilitate the insertion with a chamfer 70 which diminishes conically in the direction of insertion 14, and FIG. 7b shows an embodiment with a collar-like shape of the perimeter in the end segment 66.

A ring channel 72, which is open in the direction of insertion 14 but closed opposite the direction of insertion 14, is formed around the base of the holding element 20 by the collar-like shape (FIG. 7b). The pressure medium can act against the direction of insertion in this ring channel 72 and thus support the backward movement of the holding element 20. The collar 74 is provided with a piloting slant 76, similar to the chamfer 70 which diminishes conically in the direction of insertion 14 of the embodiment in accordance with FIG. 7a. Likewise, as in the embodiment with diameter step 68 in the end section 66 (FIG. 7a), a backwards bearing surface 78 for the latching section 54 is present. The holding element 20 and latching part 54 can be fit to each other in such a way that the second horizontal girder of the F carrying the latching section 33b has a recess (shown in FIG. 6 but not labeled) and the collar 74 has an external shape complementary to this recess. By this arrangement, the holding element 20 and the latching part 54 are effectively secured against relative movement from pressurization in the locked position.

The fourth embodiment combines the advantages of high dependability, simple assembly and disassembly, and the opportunity of using standard parts as components of receiving component 2.

The invention is not limited to the examples illustrated and described, but also includes all embodiments which work with the same idea of the invention. In particular, reference is made in full scope to the German patent application DE 196 21 535 mentioned at the beginning, which the specialist can use to obtain additional appropriate characteristics for the structural arrangement of the holding element 20. The invention is moreover not limited to the combination of characteristics defined in claim 1, but can also be defined by any desired other combination of particular characteristics of all the disclosed individual characteristics as a whole. This means in principle, that practically every individual characteristic of claim 1 can be left out and replaced by at least one individual characteristic disclosed at another place in the application. In this respect, claim 1 is to be understood merely as an initial attempt at formulation for the invention.

What is claimed is:

1. A plug-in coupling for pressure application systems, comprising two coupling components, including a receiving component and a connector component, said connector component being insertable in a locating opening of said receiving component in a direction of insertion with a connecting shaft of said connector component being arrested against loosening by locking means for locking and unlocking said coupling components including a holding element situated in a recess of one of two coupling components firstly in a partially inserted, incompletely sealed pre-lock position, and secondly in a fully inserted pressure sealed full lock-in position, said holding element having arresting elements of which each engage behind a locking edge of the other of the two coupling components when said lock-in connection is formed, and said holding element being relatively movable in said recess of said one coupling component in such a way, that, at least in said full lock-in position, one arresting element is transferred into a locked position, in which the release of the lock-in connection is prohibited, and from an unlocked position, in which the respective lock-in connection can be released, by moving said holding element against said direction of insertion.

2. The plug-in coupling according to claim 1 wherein said holding element includes a bracket situated in said recess of said one coupling component and two arresting elements, which are radially elastically clamped in said bracket and axially arranged one behind the other, wherein said first arresting element engages behind said other coupling component's locking edge in the pre-lock position, and said second arresting element engages behind said locking edge in the full lock-in position.

3. The plug-in coupling according to claim 2 wherein said bracket has on its side radially facing the locking edge, two slot-like openings, which, as a result of a radial motion of said arresting elements directed inwards, are locally penetrated by said arresting elements for engaging behind said locking edge, whereby, in both the pre-lock position and in the full lock-in position, the radially outwardly directed backward movement of said arresting elements in the locked position is restricted by said latching section.

4. The plug-in coupling according to claim 2 wherein the arresting elements are made of a material selected from the group of plastic, metal and spring steel.

5. The plug-in coupling according to claim 2 wherein said bracket is designed as a circular body with two retaining spaces for receiving said arresting elements.

6. The plug-in coupling according to claim 5 wherein said bracket is made of a single structural part and said arresting elements and said retaining spaces are designed in such a way that said arresting elements can be pushed into said retaining spaces perpendicular to an axis of said circular body.

7. The plug-in coupling according to claim 1 wherein the arresting elements can be transferred into said pre-lock position and into the full lock-in position by moving said holding element from an unlocked position into a locked position.

8. The plug-in coupling according to claim 1 further comprising at least one latching section, which contacts with said one arresting element and which is arranged stationary to said recess for positively prohibiting the release of the lock-in connection.

9. The plug-in coupling according to claim 8 wherein said latching section is a part of said receiving component in which said recess is situated.

10. The plug-in coupling according to claim 9 wherein said recess, at least in part, is formed by a molded bore in said receiving component and said latching sections are sections of said molded bore mutually staggered axially, each with a diameter reduced in comparison with the maximum diameter of said molded bore, and in said recess the regions lying behind said latching sections in a connector's direction of insertion respectively are provided with enlarged diameters compared to the latching sections.

11. The plug-in coupling according to claim 8 wherein at least one latching segment is a component of a separate ring latching part.

12. The plug-in coupling according to claim 11 wherein both latching sections are components of said separate latching part.

13. The plug-in coupling according to claim 11 wherein said latching part is fastened to said coupling part having said recess by a detachable connection.

14. The plug-in coupling according to claim 11 wherein the receiving component includes a detachable base part and an insert connected together which between each other delimit said recess receiving said holding element and wherein said latching part is held in said recess of said receiving component between said base part and said insert.

15. The plug-in coupling according to claim 1 wherein said component includes at least two detachable parts connected together, which between each other delimit said recess receiving said holding element.

16. The plug-in coupling according to claim 1 wherein said recess is an inner ring groove within said locating opening of said receiving component and said locking edge is a one-sided bounding edge of an outer ring groove on said connecting shaft.

17. The plug-in coupling according to claim 1 wherein said holding element is situated on said connecting shaft, especially in an outer ring groove, and said locking edge is formed in said locating opening of said receiving component.

18. The plug-in coupling according to claim 1 wherein said receiving component includes two detachable parts connected together, one said part includes said locking edge cooperating with said holding element mounted on said connecting shaft.

* * * * *

UNITED STATES PATENT AND TRADEMARK OFFICE
CERTIFICATE OF CORRECTION

PATENT NO. : 6,095,570

DATED : August 1, 2000

INVENTOR(S) : Hagen, et al

It is certified that error appears in the above-identified patent and that said Letters Patent is hereby corrected as shown below:

In Column 4, Line 55, please delete "8," and please insert --28,--.

In Column 10, Line 1, Claim 1, after "component," please delete "said connector component being insertable in a locating opening of said receiving component in a direction of insertion with a connecting shaft of said connector component being arrested against loosening by".

Signed and Sealed this

Twenty-ninth Day of May, 2001

*Attest:*

NICHOLAS P. GODICI

*Attesting Officer*     *Acting Director of the United States Patent and Trademark Office*